United States Patent [19]

Freund et al.

[11] Patent Number: 5,598,718

[45] Date of Patent: Feb. 4, 1997

[54] REFRIGERATION SYSTEM AND METHOD UTILIZING COMBINED ECONOMIZER AND ENGINE COOLANT HEAT EXCHANGER

[75] Inventors: Peter W. Freund, Bloomington; Lars I. Sjoholm, Burnsville; Joseph E. LaBossiere, Lino Lakes, all of Minn.

[73] Assignee: Westinghouse Electric Corporation, Pittsburgh, Pa.

[21] Appl. No.: 502,043

[22] Filed: Jul. 13, 1995

[51] Int. Cl.$^6$ ................................. B60H 1/32
[52] U.S. Cl. ................ 62/238.6; 62/239; 62/323.1
[58] Field of Search ............... 62/238.6, 323.1, 62/513, 239; 165/70, 96

[56] References Cited

U.S. PATENT DOCUMENTS

| | | | |
|---|---|---|---|
| 2,827,774 | 3/1958 | Dunkelman | 62/126 |
| 4,177,858 | 12/1979 | Daman et al. | 165/70 X |
| 4,848,445 | 7/1989 | Harper | 165/96 X |
| 4,850,197 | 7/1989 | Taylor et al. | 62/81 |
| 5,174,123 | 12/1992 | Erickson | 62/113 |
| 5,228,301 | 7/1993 | Sjoholm et al. | 62/84 |
| 5,322,114 | 6/1994 | Grabner | 165/96 X |

Primary Examiner—William E. Tapoical

[57] ABSTRACT

A transport refrigeration system for heating and cooling a conditioned space is provided that includes an improved, combined heat exchanger and economizer for increasing the efficiency of the refrigeration cycle. The system includes a refrigerant compressor driven by an internal combustion engine that includes suction and discharge ports, and an intermediate pressure port; a refrigeration circuit including a heating coil and evaporator assembly thermally connected to the conditioned space, and a mode valve for selectively routing the refrigerant through either the heating coil or the evaporator assembly via a condenser to heat or cool the conditioned space, respectively. The combined heat exchanger and economizer includes a tube connected to the intermediate suction port of the compressor, a shell for conducting refrigerant to the evaporator assembly depending upon the position of the mode valve, and a jacket for circulating engine coolant. During the heating mode of the system, a volume of refrigerant is maintained in the shell of the combined heat exchanger and economizer to act as a thermal buffer for heat transferred between engine coolant circulating through the jacket, and refrigerant flowing through the tube of the device.

18 Claims, 3 Drawing Sheets

REFRIGERATION SYSTEM AND METHOD UTILIZING COMBINED ECONOMIZER AND ENGINE COOLANT HEAT EXCHANGER

BACKGROUND OF THE INVENTION

This invention generally relates to transport refrigeration systems, and is specifically concerned with a refrigerant system and method having a combined economizer and engine coolant heat exchanger for increasing the efficiency of both cooling and heating cycles of the system.

Refrigeration systems that utilize economizers to enhance the efficiency of the refrigeration cooling cycle are known in the prior art. Such systems generally employ a refrigerant compressor having a discharge port, a suction port, and an intermediate pressure port. In a transport refrigeration system, the compressor is driven by an internal combustion engine. The discharge and suction ports are connected to a refrigeration circuit that generally comprises a condenser coil for condensing gaseous refrigerant into a liquid, and an evaporator assembly that includes an expansion valve for converting the liquid refrigerant back into a gas, and an evaporator coil that is thermally connected to a conditioned space, which may be a truck trailer. The outlet of the evaporator coil is ultimately connected to the suction port of the compressor. In such systems, the economizer is located downstream from the condenser coil and upstream from the expansion valve of the evaporator assembly. Such economizers are generally formed from a tube and shell heat exchanger in which the tube short circuits a small amount of the refrigerant flowing toward the evaporator assembly to the intermediate suction port of the compressor, while the main flow of refrigerant is conducted through the shell of the heat exchanger. A second expansion valve is placed just upstream of the tube of the economizer tube and shell heat exchanger in order to expand the small volume of liquid refrigerant into gaseous refrigerant which in turn causes the tube to precool the liquid refrigerant flowing through the shell of the economizer. The precooling of the liquid refrigerant prior to its expansion by the main expansion valve of the evaporator assembly advantageously increases the cooling capacity of the system.

Refrigeration systems capable of operating in a heating and defrosting mode are also known which employ heat exchangers to enhance the efficiency of the heating cycle. Such refrigeration systems typically employ a three-way mode valve to divert hot, gaseous refrigerant around the expansion valve of the evaporator assembly and directly into the evaporator coil, thus converting the evaporator coil into a heat radiating condenser for either defrosting or heating applications. In such systems, the heat exchanger is again placed downstream from the condenser coil and upstream from the evaporator coil that is used as a condenser during the heating cycle. The heat exchanger includes a tube for conducting the gaseous refrigerant to the compressor intermediate suction port, and a shell surrounding the tube for conducting a flow of a heating medium around the tube, which may be the hot liquid coolant of the radiator system of the internal combustion engine used to drive the compressor. The additional heat transferred to the gaseous refrigerant from the engine coolant advantageously enhances the heating capacity of the evaporator coil that is converted to use as a heat-radiating condenser during the heating cycle.

Systems utilizing a combined economizer and engine coolant heat exchanger are also known in the prior art in U.S. Pat. No. 4,850,197 assigned to the present assignee. In this combined device, a jacket that may carry hot engine coolant and a coiled tube that may carry expanding refrigerant are surrounded by a single shell which may conduct liquid refrigerant to the evaporator assembly or gaseous refrigerant to the compressor, depending upon whether the refrigerant system is operated in a cooling or heating mode. While such systems have proven to be effective for their intended purpose, the inventors have noted a number of areas where such performance might be improved. For example, the applicants have noted that the direct thermal interface between the tube conducting engine coolant and gaseous refrigerant enroute to the compressor during the heating cycle of this system may create problems when the engine coolant is at a low temperature (as may occur, for example, during start-up conditions when the ambient temperature is below freezing). Under such conditions, the engine coolant actually "bleeds" heat away from the refrigerant instead of contributing heat to it, which in turn can impair the functioning of the heating cycle. Alternatively, in instances where very hot engine coolant is first introduced into such a heat exchanger, the resulting transfer of heat can be so great as to create unduly high pressures in the gaseous refrigerant entering the compressor. Finally, the inventors have noted that it would be desirable if the size of such a combined heat exchanger could be reduced to facilitate a compact arrangement of the refrigeration components in the limited space available in a transport refrigeration system.

SUMMARY OF THE INVENTION

Generally speaking, the invention is a transport refrigeration system having a combined economizer and engine coolant heat exchanger that fulfills all of the aforementioned criteria. The transport refrigeration system of the invention comprises a refrigerant compressor, a refrigeration circuit as described, a mode valve for selectively routing refrigerant along either a heating or a cooling path, and a combined economizer and heat exchanger which, during the heating mode of the system, transfers heat from the engine coolant to gaseous refrigerant entering the compressor wherein the combined device includes a thermal buffer for moderating the transfer of heat from the engine coolant to the refrigerant. In the preferred embodiment, the heat exchanger includes a tube for conducting a flow of refrigerant to a suction port of the compressor, a shell surrounding the tube that may conduct or contain a volume of liquid refrigerant, and a jacket surrounding the shell for circulating engine coolant. In the heating mode of the system, a volume of liquid refrigerant is contained in the shell to function as a thermal buffer between the hot engine coolant circulating around the outer surface of the shell, and the tube disposed within the shell that conducts refrigerant to a suction port of the compressor.

In the preferred embodiment of the invention, the compressor includes an intermediate pressure port so that the engine coolant heat exchanger of the invention may advantageously double as an economizer when the mode valve routes refrigerant along a cooling path in the circuit. An expansion valve is positioned upstream of the tube that routes refrigerant to the intermediate pressure port of the compressor in order to vaporize the refrigerant flowing through this tube while the main flow of refrigerant enroute to the evaporator assembly of the circuit flows through the shell surrounding the tube. Concurrently, the flow of engine coolant in the jacket surrounding the shell is stopped by one or more solenoid-operated valves. Hence the device functions as a second evaporator that precools the refrigerant entering the evaporator assembly of the refrigeration circuit, thereby advantageously increasing the heat removal capacity of the evaporator coil.

The combined heat exchanger and economizer of the invention more effectively transfers heat from engine coolant to refrigerant enroute to a heating coil during the heating mode of the refrigeration system by means of a device that is also able to function as an economizer during the cooling mode of the circuit and which has a structure which is advantageously smaller and more compact than the combined economizers and heat exchangers of the prior art.

BRIEF DESCRIPTION OF THE SEVERAL

DETAILED DESCRIPTION OF THE PREFERRED EMBODIMENT

Figure 1:
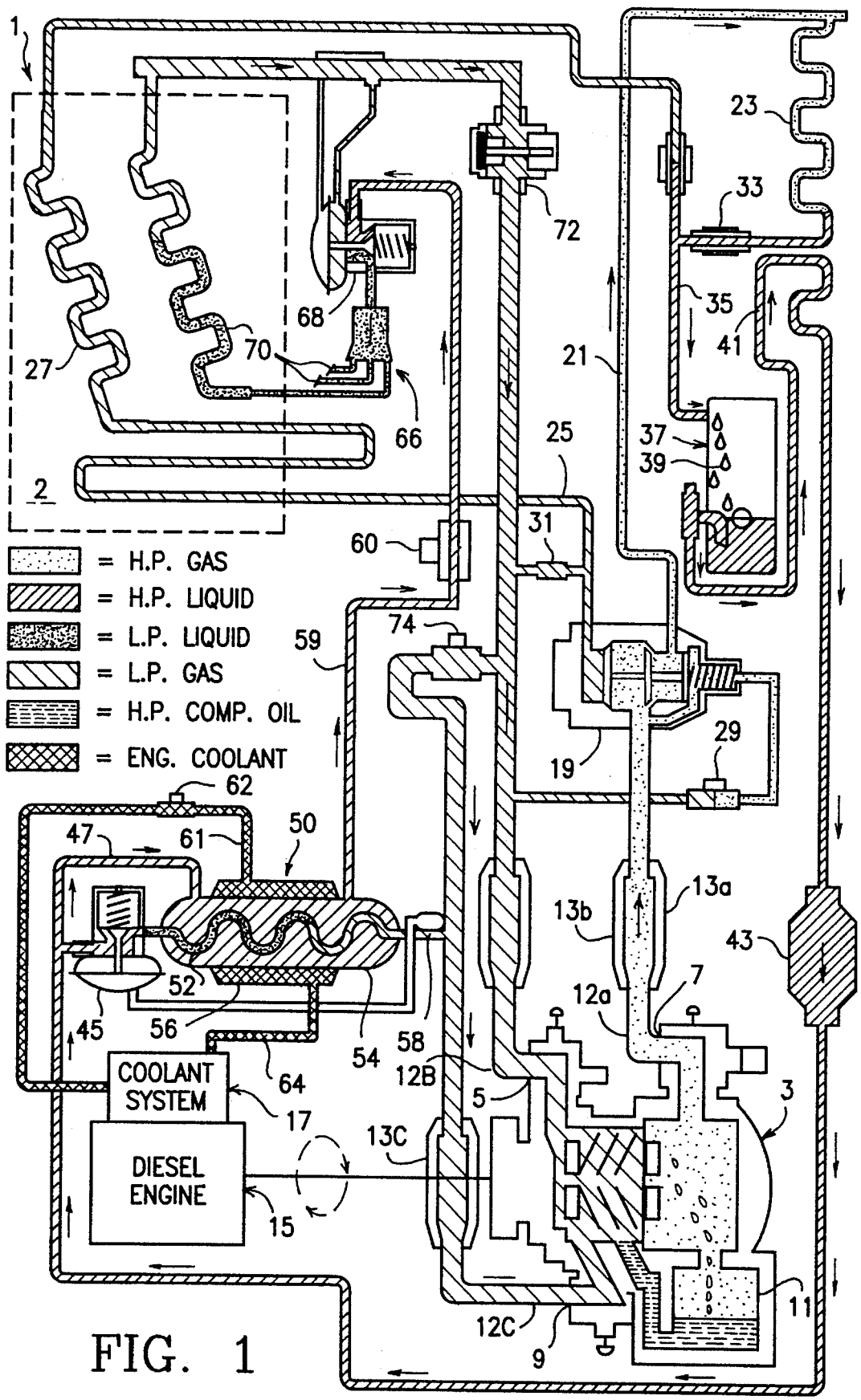
FIG. 1 is a schematic view of the transport refrigeration system of the invention shown operating in a heating mode.
Figure 3:
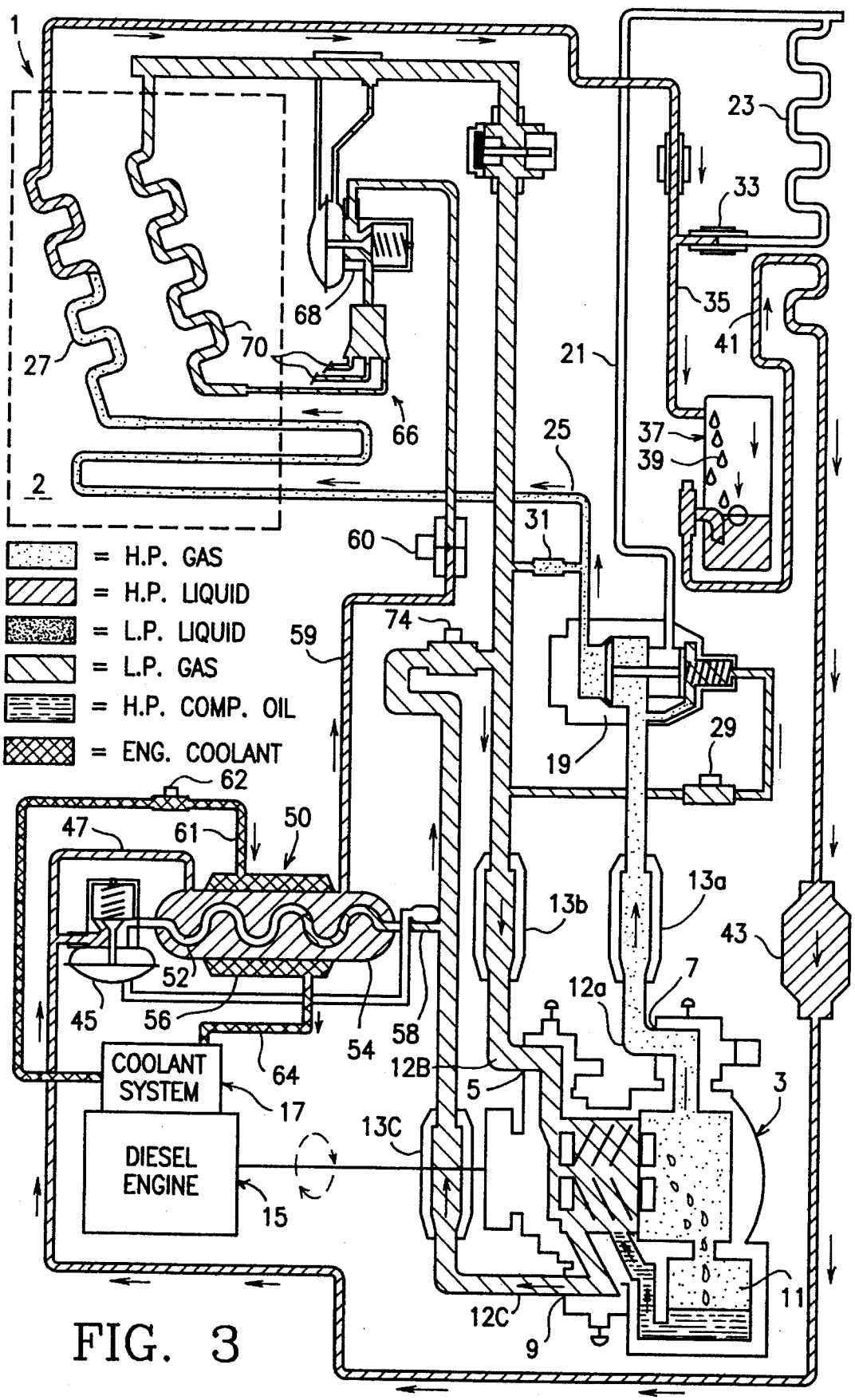
FIG. 3 is a schematic view of the refrigeration system of the invention operating in a cooling mode.

With reference now to FIGS. 1 and 3, wherein like reference numerals designate like components, the refrigeration system 1 of the invention is capable of either cooling or heating a conditioned space 2, which may be an insulated trailer carded by a diesel-powered vehicle. The system 1 includes a refrigerant compressor 3 having a suction port 5, a discharge port 7, and an intermediate pressure port 9. The compressor 3 is a screw-type compressor of the type having an oil reservoir 11 for lubricating helically-shaped screws that generate compression. By way of example, the pressure of gaseous refrigerant exiting the discharge port 7 may be on the order of 350 psi, while the pressure of gaseous refrigerant entering the suction port 5 and the intermediate pressure port 9 may be on the order of 0 psi and 25 psi, respectively. Conduits 12a, b, c are connected to the suction, discharge, and intermediate pressure ports 5, 7, and 9, respectively. Each of these conduits includes service valves 13a, b, c for fluidly isolating the compressor 3 from the rest of the system 1 during a maintenance operation. The compressor 3 is driven by a prime mover 15 which, in the preferred embodiment, is a diesel engine having its own liquid coolant system 17.

The discharge conduit 12a is connected to a three-way mode selector valve 19 that is capable of routing compressed, gaseous refrigerant to either a condenser conduit 21 connected to a condenser coil 23, or a heating coil conduit 25 connected to a heating coil 27, depending upon whether the system 1 is used to cool or heat the conditioned space 2. A solenoid-operated pilot valve 29 controls the valve elements of the three-way valve mode 19 to direct refrigerant through either condenser or heating coil conduits 21 or 25 by connecting or disconnecting the interior of the selector valve 19 to the negative pressure present in the suction conduit 12b. Additionally, a bleed orifice 31 is connected between the heating coil conduit 25 and the suction conduit 12b in order to drain refrigerant from the heating coil 27 when the three-way mode valve 29 redirects refrigerant from a heating to a cooling path through the system 1. Finally, a check valve 33 is provided between the outlet of the condenser coil 23 and conduit 35 in order to prevent refrigerant to flow back into the condenser 23, again depending upon whether the system 1 is used to cool or to heat the conditioned space 2.

Downstream of the condenser coil 23 and condenser valve 33 is a receiver 37 of a known type having a reservoir tank 39 for the collection of liquid refrigerant. The outlet of the receiver 37 is connected to a receiver outlet conduit 41 that includes a refrigerant dryer 43 for removing moisture from the liquid refrigerant that flows therethrough. Downstream of the dryer 43, the receiver outlet conduit 41 directs liquid refrigerant to both an expansion valve 45 used in conjunction with the combined economizer and heat exchanger 50 of the invention, and a refrigerant bypass conduit 47 that ultimately leads the refrigerant to the evaporator assembly of the system 1.

Figure 2:
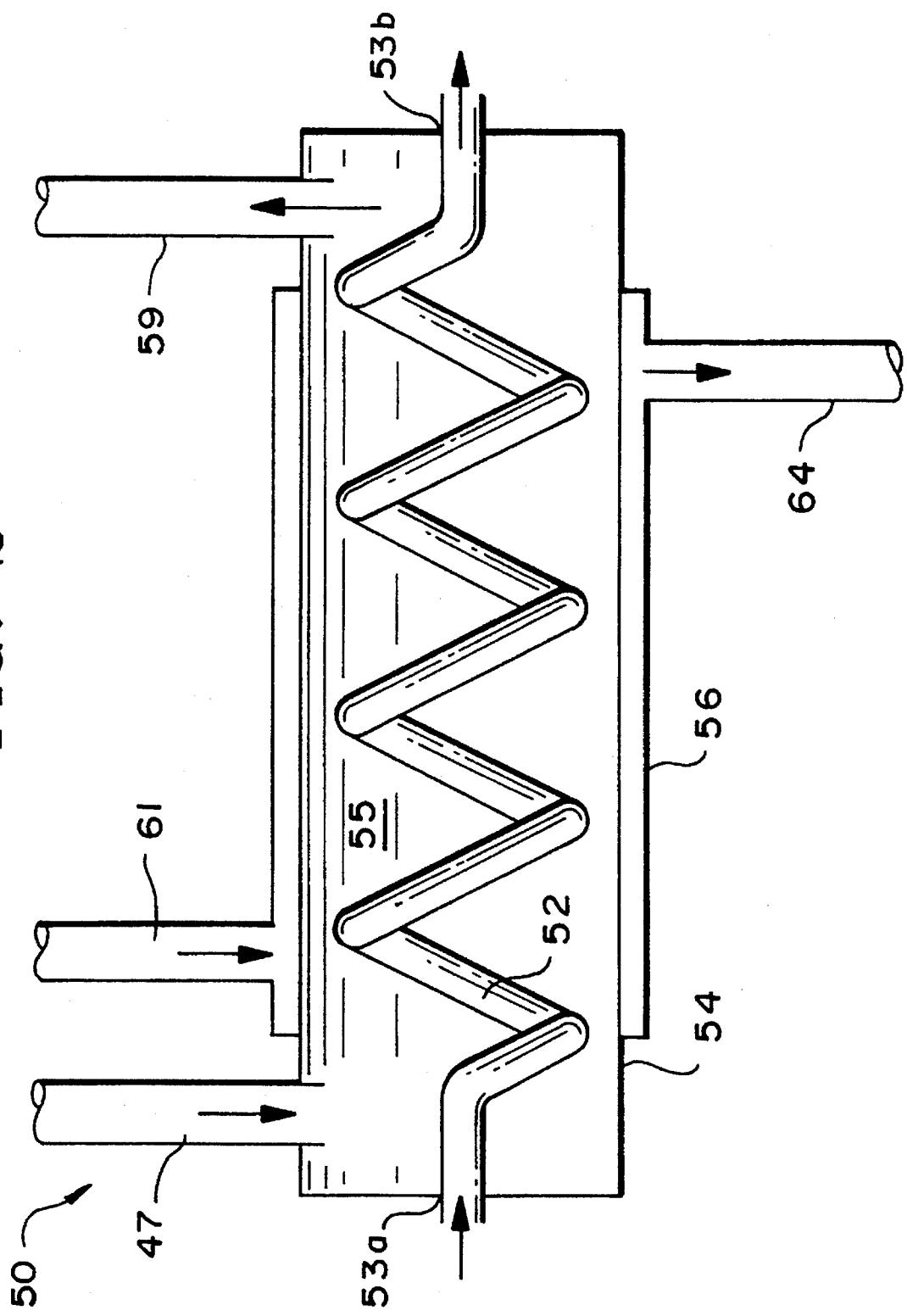
FIG. 2 is a cross-sectional view of the combined economizer and heat exchanger of the invention.

With reference now to FIGS. 1 and 2, the economizer and heat exchanger 50 of the invention includes a coiled tube 52 whose inlet 53a is connected to the outlet of the expansion valve 45, and whose outlet 53b is in turn connected to the intermediate pressure conduit 12c via tube section 58. Concentrically surrounding the coil tube 52 is a cylindrical, metallic shell 54 which constantly contains approximately six pounds of liquid refrigerant 55. Surrounding the shell 54 of the heat exchanger and economizer 50 is an annular jacket 56 for selectively placing a flow of engine coolant in heat conductive relationship around the shell 54 when the system 1 is used to heat the conditioned space 2. As will be described in more detail hereinafter, the six pounds of refrigerant 55 contained within the shell 54 advantageously functions as a thermal buffer between hot coolant circulating through the jacket 56, and boiling refrigerant conducted through the coil 52 during the heating cycle of the system 1. A refrigerant conduit 59 is connected to the shell 54 in order to selectively conduct liquid refrigerant out of the shell 54 and into an evaporator assembly 66 depending upon the state of the evaporator valve 60. Similarly, the jacket 56 includes a coolant inlet conduit 61 having a solenoid operated valve 62 for selectively allowing a flow of engine coolant through the jacket 56. The jacket 56 further includes a coolant return conduit 64 that recirculates coolant back to the coolant system 17 when coolant valve 62 is open.

With reference again to FIGS. 1 and 3, the evaporator assembly 66 of the system 1 includes an expansion valve 68 for changing the state of the liquid refrigerant flowing through the shell 54 from liquid to gas. A plurality of evaporator coils 70 (only one of which is illustrated) is connected to the outlet of the expansion valve 68 in order to absorb heat from the conditioned space 2 when the system 1 is run in a cooling mode. Downstream of the evaporator coils 70 is a throttling valve 72 for preventing the pressure of the gaseous refrigerant entering the suction conduit 12b from becoming high enough to overload the diesel engine 15 that drives the compressor 3. Finally, a solenoid operated bypass valve 74 is connected between the intermediate pressure conduit 12c and the suction conduit 12b in order to allow a higher volume of gaseous refrigerant to enter suction conduit 12b when the system 1 is operated in a heating mode, as will be described in more detail hereinafter.

With specific reference now to FIG. 1, when the system 1 is operated in a cooling mode, the solenoid-operated pilot valve 29 is closed in order to prevent slidable, spring-biased valving elements contained within the three-way selector mode valve 19 from being exposed to a negative pressure. This in turn causes the three-way valve 19 to direct all of the compressed, gaseous refrigerant discharged from the port 7 of the compressor 3 into the condenser conduit 21, and from thence to condenser coil 23. At the same time, solenoid-operated coolant valve 62 is closed so that no engine coolant flows through jacket 56. Further, the condenser valve 33 is positioned into an open state, allowing refrigerant which has been liquified by the condenser coil 23 to drain into the receiver 37 and to accumulate in reservoir 39. This high pressure liquid refrigerant is then conducted through dryer 43 in order to remove all the undesired water therefrom. From the dryer 43, a small volume of the high-pressure liquid refrigerant is forced through the expansion valve 45 upstream of the economizer heat exchanger 50, while the balance of the liquid refrigerant flows through the shell 54 of the combined heat exchanger and economizer 50. The expanding, gaseous refrigerant produced by the expansion valve 45 is directed through the coil 52 of the heat exchanger and economizer 50 which in turn advantageously cools the liquid refrigerant flowing through the shell 54. Solenoid operated valve 60 is placed in an open state so that the cooled, liquid refrigerant exiting the outlet conduit 59 can flow unimpeded into the expansion valve 68 of the evaporator assembly 66, where the precooled nature of the refrigerant entering the evaporator assembly 55 advantageously increases its capacity of absorb heat from the conditioned space 2. Gaseous refrigerant exiting the evaporator assembly reenters the suction port 5 of the compressor 3 via suction conduit 12b and throttling valve 72.

With reference now to FIG. 3, when the system 1 is operated in a heating mode, pilot valve 29 is opened to allow suction from the suction conduit 12b to slide the spring-biased internal valve elements of the three-way mode selector valve 19 such that all of the compressed, gaseous refrigerant received from the discharge conduit 12a is directed into heating coil conduit 25, and not into the condenser conduit 21. Additionally, solenoid-operated coolant valve 62 is opened to allow a circulation of coolant through jacket 56, while solenoid-operated refrigerant valve 60 is closed. From conduit 21 the relatively hot, gaseous refrigerant enters the heating coil 27, which proceeds to heat the conditioned space 2 as it changes state from a gas to a liquid. The liquid refrigerant exiting the heating coil 27 is then led directly into the receiver 37, valve 33 being closed such that none of the liquid refrigerant enters the condenser coil 23. The liquid refrigerant that collects in the reservoir 39 then exits the receiver 37 by way of the receiver outlet conduit 41. The dryer 43 proceeds to dry the liquid refrigerant it receives from the receiver 37. The dried, liquid refrigerant then enters the combined heat exchanger and economizer 50. However, because refrigerant valve 60 has been closed, liquid refrigerant entering the refrigerant bypass conduit 47 cannot flow to the evaporator assembly 66, but can only fill the interior of the shell 54. Hence, all of the liquid refrigerant entering the economizer 50 is directed through expansion valve 45 and from thence through tube 52 into the compressor 3. To accommodate the much greater volume of refrigerant flowing through the tube 52 by virtue of the closing of the valve 60, bypass valve 74 is opened so that the outlet tube 58 is exposed to the greater negative pressure present in the suction conduit 12b of the compressor 3. At the same time, the engine coolant circulating through the jacket 56 transfers additional heat to the refrigerant entering the compressor 3. This transfer of heat advantageously raises the temperature of the refrigerant entering compressor 3, which in turn increases the heating capacity of the gaseous refrigerant that the compressor 3 transmits to the heating coil 27.

Because of the six pounds of non-flowing, liquid refrigerant confined in the shell 54 of the heat exchanger and economizer 50 during the heating cycle of the system 1, the transfer of heat from the engine coolant flowing through the jacket 56 to the gaseous refrigerant flowing through the tube 52 is moderated due to the substantial thermal buffering provided by the refrigerant in the shell 54.

It should be noted that when the position of the previously described solenoid-operated valves is reversed in order to change the operation of the system 1 from a heating to a cooling mode, the bleed orifice 31 advantageously allows liquid refrigerant contained in the heating coil 27 to drain in a controlled fashion into the suction conduit 12b of the compressor 3.

What is claimed:

1. A transport refrigeration system for heating and cooling a conditioned space, comprising:

a refrigerant compressor having a suction port and a discharge port and being driven by an internal combustion engine having a fluid coolant system;

a refrigeration circuit including a heating coil and an evaporator assembly thermally connected to a conditioned space;

mode valve means for selectively routing refrigerant from said compressor discharge port in either a heating path to said heating coil or a cooling path to said evaporator assembly via a condenser, and a heat exchanger means upstream of said suction port of said compressor for transferring heat from coolant from said engine coolant system to refrigerant entering said suction port when said mode valve means routes refrigerant along said heating path, including a thermal buffer means for moderating the transfer of heat to said refrigerant from said coolant, wherein said heat exchanger means includes a tube means for conducting a flow of refrigerant to said compressor suction port, a shell means surrounding said tube means for containing and conducting refrigerant from said circuit, and a jacket means overlying said shell means for conducting a flow of engine coolant, and said thermal buffer means is formed from refrigerant contained in said shell means.

2. The transport refrigerant system of claim 1, wherein said compressor includes an intermediate pressure port, and said tube means of said heat exchanger means is connected to said intermediate pressure port.

3. The transport refrigerant system of claim 1, wherein said heat exchanger means further includes a refrigerant expansion means upstream of said tube means, and further functions to subcool a flow of refrigerant through said shell means enroute to said evaporator assembly when said mode valve means routes said refrigerant along said cooling path.

4. The transport refrigeration system of claim 3, wherein said heat exchanger means includes coolant valve means for both conducting and preventing a flow of engine coolant through said jacket means.

5. The transport refrigeration system of claim 3, wherein said heat exchanger means includes refrigerant valve means for both conducting and preventing a flow of refrigerant through said shell means.

6. The transport refrigeration system of claim 5, wherein said refrigerant valve means also functions to retain refrigerant in said shell means when it prevents refrigerant from flowing into said evaporator assembly.

7. The transport refrigeration system of claim 2, wherein said compressor is a screw-type compressor.

8. The transport refrigeration system of claim 1, wherein said refrigeration circuit further includes a throttle valve downstream of said evaporator assembly for controlling suction pressure.

9. A transport refrigeration system for heating and cooling a conditioned space, comprising:

a refrigerant compressor having a suction port, a discharge port, and an intermediate pressure port, said compressor being driven by an internal combustion engine having a liquid coolant system;

a refrigeration circuit including a heating coil and an evaporator assembly thermally connected to a conditioned space, and a condenser;

mode valve means for selectively routing refrigerant from said compressor discharge port in either a heating path to said heating coil or a cooling path to said evaporator assembly via said condenser, and a heat exchanger means connected to said intermediate pressure port of said compressor for transferring heat from said engine coolant system to refrigerant entering said intermediate pressure port when said mode valve means routes refrigerant along said heating path, said heat exchanger means including a thermal buffer means formed from a volume of liquid refrigerant for moderating the transfer of heat to said refrigerant from coolant in said coolant system, and a refrigerant expansion means, and also functions to subcool refrigerant flowing to said evaporator means when said mode valve means routes refrigerant along said cooling path.

10. The transport refrigeration system of claim 9, wherein said heat exchanger means includes a tube means downstream of said expansion means for conducting gaseous refrigerant to said intermediate pressure port, and a shell means surrounding said tube means for conducting liquid refrigerant, and a jacket means surrounding said shell means for conducting a flow of engine coolant, wherein said thermal buffer means is formed from refrigerant in said shell means that moderates the rate of heat transfer between said jacket means and said tube means.

11. The transport refrigeration system of claim 10, wherein said heat exchanger means includes coolant valve means for both conducting and preventing a flow of engine coolant through said jacket means.

12. The transport refrigeration system of claim 10, wherein said heat exchanger means includes a refrigerant valve means for both conducting and preventing a flow of refrigerant through said shell means.

13. The transport refrigeration system of claim 12, wherein said refrigerant valve means also functions to retain refrigerant in said shell means when it prevents refrigerant from flowing into said evaporator assembly.

14. The transport refrigeration system of claim 9, wherein said compressor is a screw-type compressor.

15. The transport refrigeration system of claim 9, wherein said condenser is downstream of said evaporator assembly, and said refrigeration circuit further includes a condenser valve for admitting refrigerant into the condenser when said mode valve means routes refrigerant in said cooling path.

16. The transport refrigeration system of claim 9, wherein said refrigeration circuit further includes a throttle valve downstream of said evaporator assembly for controlling suction pressure.

17. A transport refrigeration system for heating and cooling a conditioned space, comprising:

a screw-type refrigerant compressor having a suction port, a discharge port, and an intermediate pressure port, said compressor being driven by an internal combustion engine having a liquid coolant system;

a refrigeration circuit including a heating coil and an evaporator assembly thermally connected to a conditioned space, a condenser downstream of the evaporator assembly, and a condenser valve for admitting refrigerant into the condenser;

three-way mode valve means for selectively routing refrigerant from said compressor discharge port in either a heating path to said heating coil or a cooling path to said condenser valve and said evaporator assembly, and a heat exchanger means having an inlet for receiving refrigerant in said circuit and an outlet for discharging said refrigerant into said intermediate pressure port of said compressor for transferring heat from said engine coolant system to refrigerant entering said intermediate pressure port when said mode valve means routes refrigerant along said heating path, and for subcooling refrigerant enroute to said evaporator assembly when said mode valve means routes said refrigerant along said cooling path, wherein said heat exchanger means includes a thermal buffer means formed from a volume of refrigerant from said circuit for moderating the transfer of heat from engine coolant to refrigerant flowing between said inlet and outlet.

18. A transport refrigeration system for heating and cooling a conditioned space, comprising:

a refrigerant compressor having a suction port and a discharge port and being driven by an internal combustion engine having a fluid coolant system;

a refrigeration circuit including a heating coil and an evaporator assembly thermally connected to a conditioned space and a condenser upstream of said evaporator assembly, and a condenser valve for admitting refrigerant into the condenser;

mode valve means for selectively routing refrigerant from said compressor discharge port in either a heating path to said heating coil or a cooling path to said evaporator assembly via said condenser valve, and a heat exchanger means upstream of said suction port of said compressor for transferring heat from coolant from said engine coolant system to refrigerant entering said suction port when said mode valve means routes refrigerant along said heating path, including a thermal buffer means for moderating the transfer of heat to said refrigerant from said coolant.

\* \* \* \* \*